J. T. WHITE.
KICKING MULE.
APPLICATION FILED APR. 3, 1920.
1,342,882. Patented June 8, 1920.
Fig. 1.
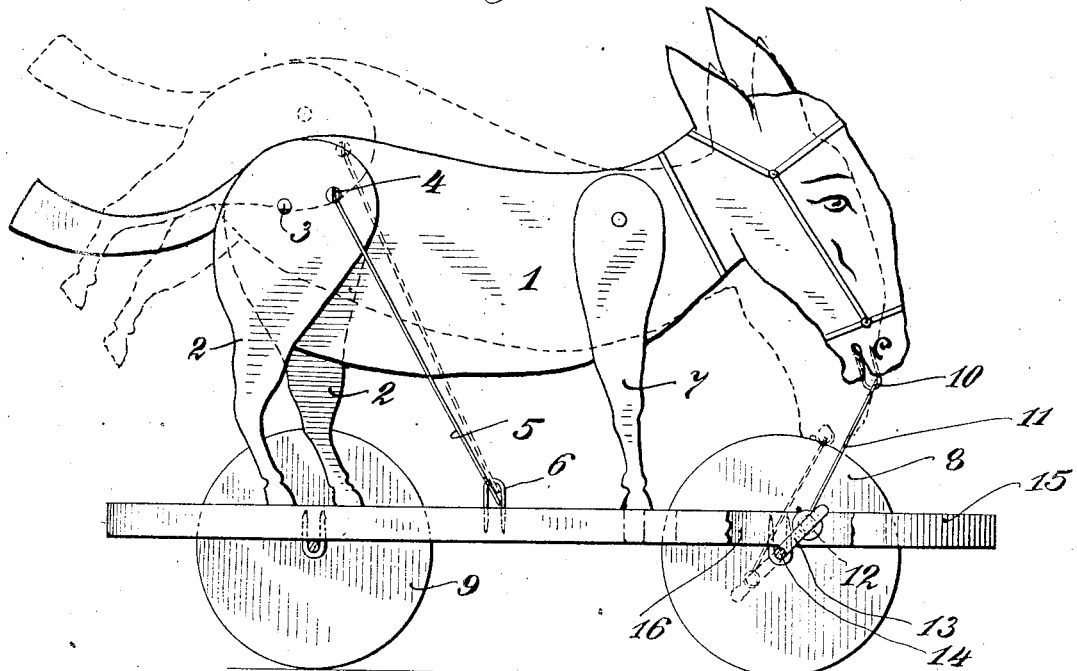
Fig. 2.
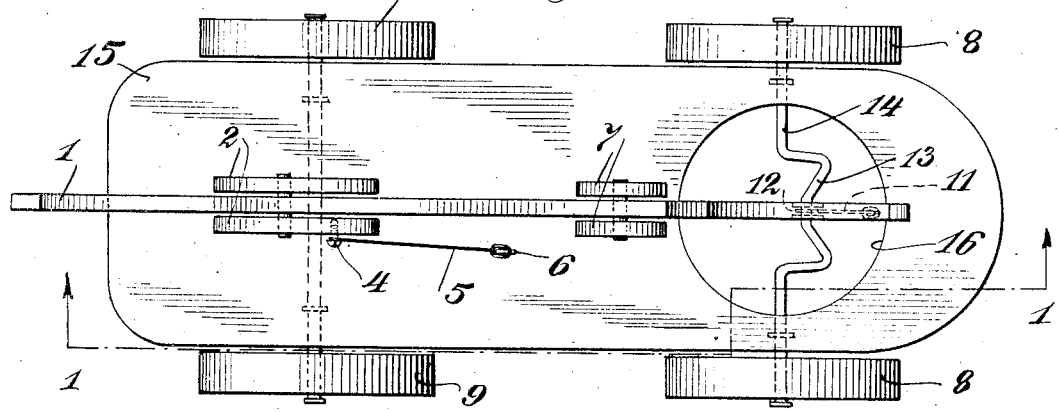
Fig. 3.
Inventor
John Thomas White
By his Attorney
Benjamin Webster

UNITED STATES PATENT OFFICE.

JOHN THOMAS WHITE, OF NEW YORK, N. Y.

KICKING MULE.

1,342,882.  Specification of Letters Patent.  Patented June 8, 1920.

Application filed April 3, 1920. Serial No. 370,963.

*To all whom it may concern:*

Be it known that I, JOHN THOMAS WHITE, a citizen of the United States, and resident of New York, in the county of Bronx and State of New York, have invented certain new and useful Improvements in Kicking Mules, of which the following is a specification.

This invention relates to toys and more particularly to toys having parts capable of motion to simulate the actions of the legs of an animal, and has for its object to provide a toy of this nature that will portray with considerable verisimilitude the principles of the kicking mule. Other objects will appear as the description proceeds.

In the preferred embodiment the invention consists in a wooden platform mounted to move forward or backward on wheels. A figure cut from flat wood, so that in side view it resembles the outline of a mule, is pivotally mounted to oscillate, to raise and lower the hind quarters of the animal, on a horizontal pivot which is mounted in parts fixed in the platform to resemble the forelegs of an animal. The hind legs are also pivotally mounted but hang loose to make even contact with the platform. A crank-shaft incorporated in the front axle-tree, which turns with the front wheels, actuates a wire connected with a link in the animal's nose. When the nose is pulled down the rear quarters of the animal are elevated. A wire connects a pivot fastened on a rear leg with a staple fastened in the platform. This staple is elongated so that the wire can travel upwardly some distance before exerting a downward pull to kick the legs to the rear. By my improved construction the rapid velocity of travel through space of a mule's hind legs and heels is vividly depicted.

Reference is made to the drawings for a detailed showing of the preferred form of my invention, in which—

Figure 1 is an elevation on the line 1—1 of Fig. 2, viewed in the direction of the arrows, with the mule's hind quarters in elevated position in dotted lines, Fig. 2 is a plan view, and Fig. 3 is a detail showing the crankshaft incorporated in the front axle-tree.

The body 1 of the animal is cut or pressed out of wood or paper, although it may be of any suitable material, to resemble in side view the body of a mule. The hind legs 2, 2 are both fixed on a shaft 3, which is rotatably mounted on the rear end of the animal, so that the hind legs can be actuated to swing to the rear, but the weight of the legs below the point of suspension is such that they usually hang straight down like to a mule's hind legs when they are in the normal quiescent state.

In order to actuate these hind legs independently of other movements of the body I provide forwardly of the pivoted shaft 3 a pin 4 about which one end of the wire 5 is looped, so that the loop turns about the pin 4 as a pivot. A staple 6 is fastened in the platform 15. The lower end of the wire 5 is looped about the staple to slide therein. It is clear that the initial movement upwardly of the mule's hind legs, during the initial movement of elevation of the hind quarters of the animal, does not change the relative position of the hind legs. But as the elevation continues the loop in the lower end of the wire 5 suddenly comes in contact with the top of the staple 6 and the hind legs 2, 2 fly outwardly and upwardly with tremendous velocity, producing in versimilitude the action of the living animal.

The front legs 7, 7 are fixed in the platform 15, and the mule is oscillated in a vertical plane on a bearing shaft passed through them and fixed to them.

The platform 15 is mounted on two pairs of wheels, a front pair 8, 8 and a rear pair 9, 9. The front pair of wheels 8, 8 is fixed to the axle-tree 14, and incorporated in the center of the axle-tree and integral therewith is a crank 13, having a horizontal bearing 12 about which one end of the wire 11 is looped. The other end of the wire 11 is looped about a staple in the nose of the animal. A downward pull on the wire 11 is similar to the jerk on the halter rope given to the real animal.

Every rotation of the front wheels 8, 8 jerks down the nose of the animal, elevates the hind quarters of the animal, and immediately after the initial movement causes the hind legs to fly out with great velocity. A hole 16 is formed in the platform 15 to permit the rotation of the crank 13 and the oscillation of the wire 11 therein.

Other analogous toys have been constructed, but no toy has been heretofore produced so constructed as to depict with verisimilitude the action of the kicking mule of real life.

Realizing that many modifications will readily occur to those skilled in the art I do not wish to limit myself except as in the appended claim.

I claim:

A toy comprising in combination a wooden platform, one front pair of wheels and one rear pair, said front pair being fixed to an axle-tree, a hole in the platform above the axle-tree, said axle-tree having incorporated therein a crank adapted to turn in the hole, two parts vertically mounted in the platform behind the hole to simulate an animal's forelegs, a bearing passed through said parts and fixed thereto, a part to simulate an animal's body pivotally mounted on the bearing between the two vertical parts, a shaft passed through and adapted to rotate in the hind quarters of the animal, two parts fixed thereto to simulate the hind legs of an animal, a pin projecting horizontally from one of said parts in front of the shaft, a wire having a loop passed around said pin and its lower end looped through a staple having an elongated slot and fixed in the platform near the front legs, another staple fixed in the nose of the animal, and a rigid wire loosely connected with said staple and at the lower end looped around the bearing of the crank.

Signed at New York city, in the county of New York and State of New York, this 27 day of March, A. D. 1920.

JOHN THOMAS WHITE.